US010223582B2

(12) United States Patent
Tan et al.

(10) Patent No.: US 10,223,582 B2
(45) Date of Patent: Mar. 5, 2019

(54) GAIT RECOGNITION METHOD BASED ON DEEP LEARNING

(71) Applicant: WATRIX TECHNOLOGY, Beijing (CN)

(72) Inventors: Tieniu Tan, Beijing (CN); Liang Wang, Beijing (CN); Yongzhen Huang, Beijing (CN); Zifeng Wu, Beijing (CN)

(73) Assignee: Watrix Technology, Beijing (CN)

( * ) Notice: Subject to any disclaimer, the term of this patent is extended or adjusted under 35 U.S.C. 154(b) by 14 days.

(21) Appl. No.: 15/521,751

(22) PCT Filed: Oct. 28, 2014

(86) PCT No.: PCT/CN2014/089698
§ 371 (c)(1),
(2) Date: Apr. 25, 2017

(87) PCT Pub. No.: WO2016/065534
PCT Pub. Date: May 6, 2016

(65) Prior Publication Data
US 2017/0243058 A1 Aug. 24, 2017

(51) Int. Cl.
*G06K 9/00* (2006.01)
*G06K 9/62* (2006.01)
(Continued)

(52) U.S. Cl.
CPC ....... *G06K 9/00348* (2013.01); *G06K 9/4628* (2013.01); *G06K 9/627* (2013.01); *G06K 9/6215* (2013.01); *G06K 9/66* (2013.01)

(58) Field of Classification Search
CPC .. G06K 9/00348; G06K 9/627; G06K 9/6215; G06K 9/66; G06K 9/00288;
(Continued)

(56) References Cited

U.S. PATENT DOCUMENTS 9,633,268 B1 * 4/2017 Ma .................... G06K 9/00342
9,775,726 B2 * 10/2017 Martin .................. A61F 2/6607
(Continued)

FOREIGN PATENT DOCUMENTS

| CN | 102222215 A | 10/2011 |
| CN | 103593651 A | 2/2014 |
| CN | 103839081 A | 6/2014 |

OTHER PUBLICATIONS

International Search Report and English translation dated May 6, 2016 for International Application No. PCT/CN2014/089698 filed Oct. 28, 2014, 5 pages.
(Continued)

*Primary Examiner* — Jingge Wu
(74) *Attorney, Agent, or Firm* — John D. Veldhuis-Kroeze; Westman, Champlin & Koehler, P.A.

(57) ABSTRACT

The present disclosure relates to a gait recognition method based on deep learning, which comprises recognizing an identity of a person in a video according to the gait thereof through dual-channel convolutional neural networks sharing weights by means of the strong learning capability of the deep learning convolutional neural network. Said method is quite robust to gait changes across a large view, which can effectively solve the problem of low precision in cross-view gait recognition existing with the prior art gait recognition technology. Said method can be widely used in scenarios having video monitors, such as security monitoring in airports and supermarkets, person recognition, criminal detection, etc.

8 Claims, 2 Drawing Sheets

(51) Int. Cl.
  *G06K 9/66* (2006.01)
  *G06K 9/46* (2006.01)
(58) Field of Classification Search
  CPC .................. G06K 9/00342; G06K 9/4628;
         A61B 5/1116; A61B 5/112; A61B 5/1123;
                   A61B 5/7246; A61B 5/7267
  See application file for complete search history.

(56) References Cited

U.S. PATENT DOCUMENTS

| | | | | |
|---|---|---|---|---|
| 9,984,284 | B2* | 5/2018 | Binsaadoon | G06K 9/4671 |
| 2009/0012433 | A1* | 1/2009 | Fernstrom | A61B 5/1112 |
| | | | | 600/593 |
| 2015/0282766 | A1* | 10/2015 | Cole | A61B 5/7267 |
| | | | | 702/139 |
| 2016/0005050 | A1* | 1/2016 | Teman | G06K 9/627 |
| | | | | 705/317 |
| 2016/0278947 | A1* | 9/2016 | Martin | A61F 2/68 |
| 2016/0350610 | A1* | 12/2016 | Yoo | G06K 9/00369 |

OTHER PUBLICATIONS

Written Opinion of the International Search Authority dated May 6, 2016 for International Application No. PCT/CN2014/089698 filed Oct. 28, 2014, 3 pages.

* cited by examiner

GAIT RECOGNITION METHOD BASED ON DEEP LEARNING

CROSS REFERENCE TO RELATED APPLICATION

This Application is a Section 371 National Stage Application of International Application No. PCT/CN2014/089698 filed Oct. 28, 2014, and published, not in English, as WO 2016/065534 A1 on May 6, 2016.

FIELD OF THE DISCLOSURE

The present disclosure relates to computer vision and pattern recognition, in particular to a gait recognition method based on deep learning.

BACKGROUND OF THE DISCLOSURE

There is a typical gait recognition method which is to first obtain the profile of a person from all sequences of a video and obtain Gait Energy Images (GEI) of said person by calculation, then compare the similarity between different GEIs, and finally perform a match through a nearest neighbor classifier. However, the prior methods cannot achieve any practical precision when severe cross-view problems are encountered.

The deep learning theory has achieved very good effects in such fields as voice recognition, image target classification and detection, especially the deep convolutional neural network has a very strong ability of automatic learning and highly non-linear mapping, which makes it possible to design complicated high-precision classification models.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter.

In order to solve the problem of low precision in performing cross-view gait recognition by the prior art gait recognition technology, the present disclosure provides a gait recognition method based on deep learning, which represents a gait sequence by means of a gait energy image, and trains a matching model through a deep convolutional neural network, thereby matching the identity of the subject whose gait is recognized. Said method comprises a training process and a recognizing process, which comprise:

Training process S1: extracting gait energy images from a training gait video sequence whose identity has been marked, and repeatedly selecting any two of them to train a matching model based on the convolutional neural network until the model converges;

Recognizing process S2: extracting gait energy images from a single-view to-be-recognized gait video and a registered gait video sequence, respectively, and calculating similarity between the gait energy image of the single-view to-be-recognized gait video and each of the gait energy images of the registered gait video sequence by using the matching model based on the convolutional neural network as trained in 51, and predicting the identity based on the similarity and outputting the result of recognition.

Preferably, said matching model based on the convolutional neural network comprises a feature extracting module and a perceptron module.

Preferably, the training process S1 includes the following steps:

step S11: extracting gait energy images from a training gait video sequence comprising multiple views;

step S12: selecting a pair of gait energy images having the same identity as positive samples, and selecting a pair of gait energy images having different identities as negative samples;

step S13: selecting a positive sample or a negative sample to be sent to the feature extracting module of the matching model based on the convolutional neural network, and extracting a pair of features corresponding to the pair of gait energy images included in said sample;

step S14: sending the pair of features obtained in step S13 to the perceptron module of the matching model based on the convolutional neural network and outputting the result of matching;

step S15: calculating an error between the result of matching and the real result and optimizing said matching model based on the convolutional neural network;

step S16: repeating steps S13 to S15 until said matching model based on the convolutional neural network converges.

step S21: extracting a sequence of gait energy images of the registered gait video sequence;

step S22: inputting the sequence of gait energy images of the registered gait video sequence into the feature extracting module of the matching model based on the convolutional neural network, and calculating the respective feature sequences;

step S23: extracting the gait energy image of the single-view to-be-recognized gait video;

step S24: inputting the gait energy image of the single-view to-be-recognized gait video into the feature extracting module of the trained matching model based on the convolutional neural network, and calculating the corresponding features;

step S25: calculating similarity for the features obtained in S24 and the feature sequences obtained in S22 by the perceptron module of the matching model based on the convolutional neural network;

step S26: calculating a result of identity recognition by using a classifier based on the similarity obtained in S25.

Preferably, step S21 further comprises a step of determining the first-time recognition process, and if it is the first-time recognition process, performing steps S22 to S26 in sequence after extracting the gait energy image of the registered gait video sequence; or else, if it is not the first-time recognition process, performing steps S23 to S26 in sequence.

A matching library is provided in S22, and the gait energy images of the registered gait video sequence and the corresponding features calculated in S22 are stored in the matching library.

Preferably, the views of the multiple-view training gait video sequence are divided equally into 11 views from 0° to 180° based on the viewing angles.

Preferably, for each registered gait video in the registered gait video sequence, only the gait energy images under one view need to be extracted.

Preferably, selection of the gait energy images in S12 should be a selection from gait energy images of different views based on the same probability.

Preferably, a ratio between the numbers of positive samples and negative samples in S12 should be equal to a preset value.

Preferably, the number of positive samples and the number of negative samples are equal in S12.

The present disclosure constructs a matching model based on the convolutional neural network and trains said model by using a training gait video sequence including multiple views and optimizes corresponding parameters, so that the trained matching model based on the convolutional neural network has the capability of cross-view gait recognition. During the process of recognizing, the matching model based on the convolutional neural network is used to extract features from the single-view to-be-recognized gait video and the registered gait video sequence and calculate similarity therebetween, thereby recognizing identity of the person in the single-view to-be-recognized gait video. Said method has higher accuracy in processing cross-view gait recognition, so it can be widely used in scenarios having video monitors, such as security monitoring in airports and supermarkets, person recognition, criminal detection, etc.

DETAILED DESCRIPTION

For the purpose of having the object, technical solution and advantages of the present disclosure more apparently for those skilled in the art, further detailed descriptions about the disclosure are given blow in conjunction with a specific embodiment and with reference to the figures.

Some terms are used for denoting specific system components throughout the application document. As would be appreciated by those skilled in the art, different designations are usually used for denoting the same component, thus the application document does not intend to distinguish those components that are only different in name rather than in function. In the application document, terms "comprise", "include" and "have" are used in the opening way, and thus they shall be construed as meaning "comprise but not limited to . . . ."

The following detailed description refers to the accompanying drawings that show, by way of illustration, specific details and aspects of this disclosure. The word "exemplary" is used herein to mean "serving as an example, instance, or illustration". Any aspect of this disclosure or design described herein as "exemplary" is not necessarily to be construed as preferred or advantageous over other aspects of this disclosure or designs.

In order to better describe in conjunction with the specific embodiment, the present embodiment is described with reference to an actual test example, wherein the testing process is equivalent to the recognition process in practical application, and the test gait video is equivalent to the single-view to-be-recognized gait video in practical application.

In the present embodiment, dual-channel convolutional neural networks sharing weights are used to construct the matching model based on the convolutional neural network, said model comprising a feature extracting module and a perceptron module. Said embodiment specifically includes a training process and a testing process, and the method according to this embodiment are described as follows with reference to FIG. 1 and FIG. 2.

Training Process

Step S11: extracting a gait energy image sequence GEI-1, . . . GEI-I, . . . GEI-N from a training gait video sequence involving multiple views. First a conventional foreground segmentation method based on a Gaussian mixture model is used to extract silhouettes of a person from the gait video sequence, foreground areas are located and cut according to the gravity centers of the silhouettes and are normalized to the same dimension by scaling, then an average silhouette image of each sequence is acquired, which is the gait energy image.

Figure 3:
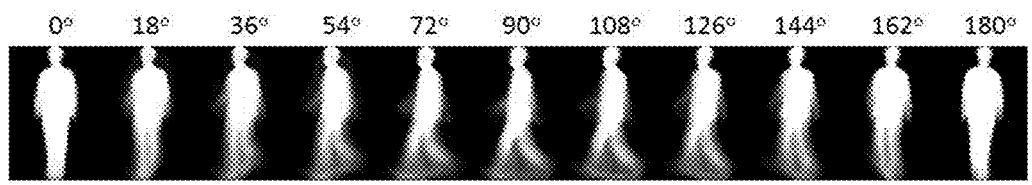
FIG. 3 shows an example of a multiple-view gait energy image according to the present disclosure.

For example, a marked multiple-view walking video of 100 persons is used as the training gait video sequence, which includes multiple views, as shown in FIG. 3. In a state of substantially the same level as the heights of the persons, the views are divided according to the viewing angles into 11 views including 0°, . . . 18°, . . . , 180°, and identities of walkers in each sequence are marked. Silhouettes of persons are extracted from a sequence of said 1100 gait videos to calculate the gait energy image.

Step S12: selecting positive samples and negative samples. Pairs of gait energy images having the same identity are selected as positive samples, and pairs of gait energy images having different identities are selected as negative samples. The selection of the gait energy images should be a selection from gait energy images of different views based on the same probability. First, gait energy images of different views in the gait energy image sequence of the training gait video sequence should have the same probability of being selected, and the matching model based on the convolutional neural network is trained according to the fairly selected various cross-view circumstances. Second, the positive and negative samples are used based on a preset ratio. Since the number of pairs of gait energy images having the same identity is far less than the number of pairs of gait energy images having different identities, if the ratio of the positive samples to negative samples is not limited and the selection is performed according to the natural probability, there would be very few positive samples, which will result in over-fitting of the matching model based on the convolutional neural network in the training process. Preferably, the positive and negative samples may be made to have the same probability of appearance.

Figure 1:
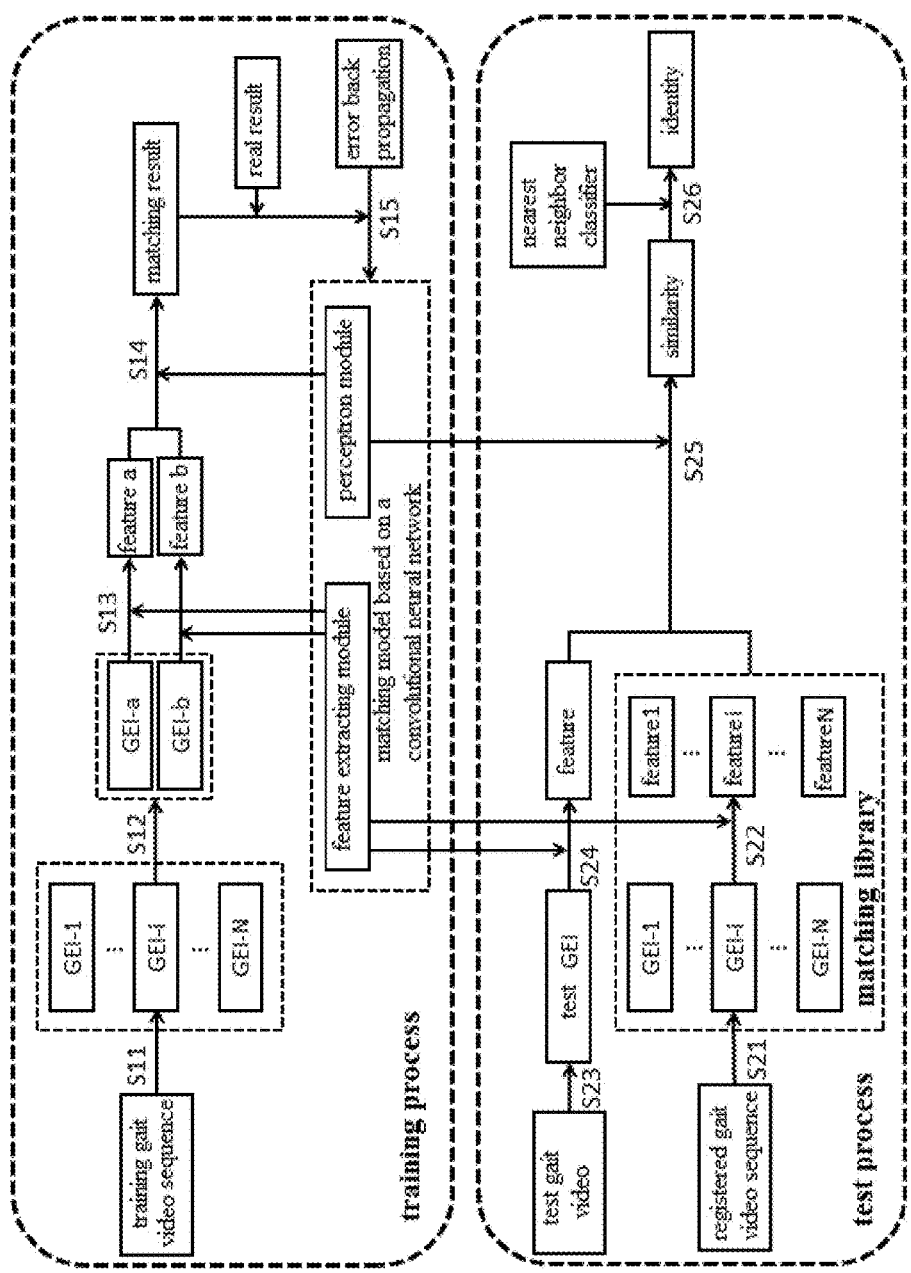
FIG. 1 is a schematic drawing of an algorithm framework according to the present disclosure.
Figure 2:
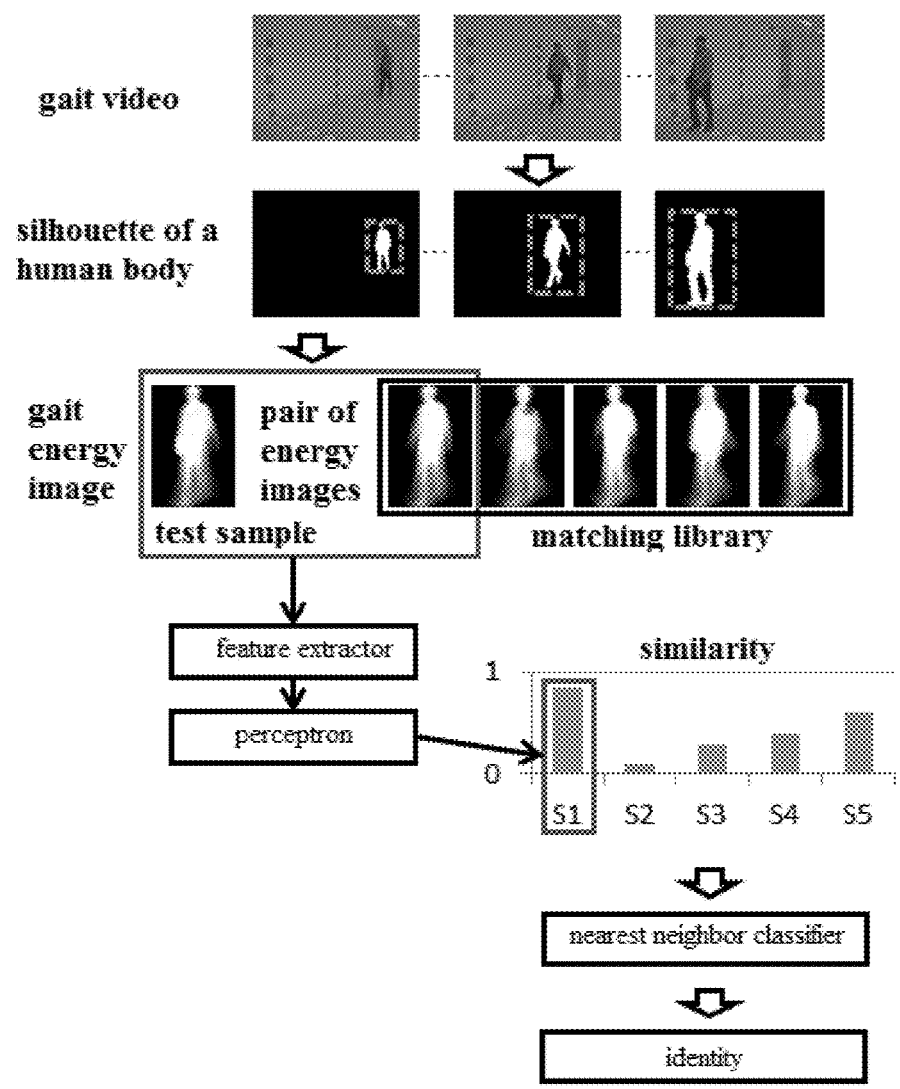
FIG. 2 is a flowchart of a gait-based authentication algorithm according to the present disclosure.

Step S13: sending each pair of gait energy images forming the positive and negative samples in S12 to the matching model based on the convolutional neural network, and extracting their corresponding features by means of a forward propagation algorithm. As shown in FIG. 1, the feature extracting module of the matching model based on the convolutional neural network is used to extract corresponding features of gait energy images GEI-a, GEI-b as feature a and feature b. Since it is necessary to perform the same operation on two gait energy images of the sample, it is manifested as two channels sharing weights. For example, the parameter configuration of a typical network is that a first layer has 16 convolution operator of 7×7, the step length is 1 and has a spatial aggregation layer of 2×2 which has a step length of 2; a second layer has 64 convolution operators of 7×7, the step length is 1 and has a spatial aggregation layer of 2×2 which has a step length of 2; a third layer has 256 convolution operators of 11×11, and the step length is 5.

Step S14: comparing features of the two gait energy images extracted in S13 and giving a score of similarity by using the perceptron module of the matching model based on the convolutional neural network, and determining if said two images have the same identity. For example, when the similarity has a value ranging from 0 to 1, it can be set that when the similarity is greater than 0.5, the gait video sequences corresponding to said pair of features can be predicted to have the same identity; otherwise, they are predicted to have different identities.

Step S15: training the matching model based on the convolutional neural network using the error back propagation algorithm by means of an error between the result of matching and the real result.

Step S16: repeating steps S13-S15 until said matching model based on the convolutional neural network converges.

The above-mentioned error back propagation algorithm is mainly used for training of a multi-layer model, and the main part thereof is repetitive iteration of incentive propagation and weight updating until a convergence condition is met. In the incentive propagation stage, feature a and feature b are sent to the perceptron module of the matching model based on the convolutional neural network to obtain a result of matching, then a difference between the result of matching and the real result is calculated so as to obtain an error between the output layer and the monitoring layer. In the weight updating stage, a known error is multiplied by a derivative of a function of a present layer response to a previous layer response, thereby obtaining a gradient of a weight matrix between the two layers, then the weight matrix is adjusted at a certain proportion in a direction opposite to said gradient. Next, said gradient is used as an error of the previous layer so as to calculate a weight matrix of the previous layer. The entire model is updated in such a manner.

The testing process mainly uses the trained matching model based on the convolutional neural network in S1 to perform feature extraction and similarity calculation on the registered gait video sequence and the test gait video so as to determine the identity. A registered gait video sequence for which the identity information has been pre-registered is needed, i.e. a gait sequence including multiple persons (e.g. 1000 persons) and identities of corresponding persons. It shall be noted that although providing data of multiple views in the registered gait video sequence can enhance the effect of recognition, since the model obtained by training in S15 already has the ability of cross-view gait recognition, each registered gait video in said registered gait video sequence only needs to include the gait video of one view. The testing task herein is to predict the corresponding identity for a single-view test gait video in the case of said registered gait video sequence, which is described as follows:

step S21: referring to the method in S11, extracting a sequence of gait energy images of the registered gait video sequence;

step S22: inputting the sequence of gait energy images of the registered gait video sequence into the feature extracting module of the matching model based on the convolutional neural network, and extracting a sequence of features robust to cross-view changes. This can help to reduce complexity of calculation. Considering the problem concerning feature volume, the example network structure given in step S13 has the sampling interval increased in the third layer. For a gait energy image input of 128×128, the feature length is 2304 (3×3×256);

step S23: referring to the method in S11, extracting a gait energy image of the test gait video;

step S24: for the test gait video, calculating features robust to cross-view changes by using the feature extracting module of the matching model based on the convolutional neural network;

step S25: calculating the similarity for the features obtained in S24 and the sequence of features obtained in S22 by using the perceptron module of the matching model based on the convolutional neural network;

step S26: in the simplest case, using a nearest neighbor classifier to determine the currently tested identity, i.e. providing the registered identity of the sequence in the matching library having the highest similarity.

In order to better increase the speed of matching, a step of determining the first testing process can be added in S21, and if it is the first-time testing process, steps S22 to S26 are performed in sequence after extracting the gait energy image of the registered gait video sequence; if it is not the first-time testing process, steps S23 to S26 are performed in sequence. A matching library is provided in S22, and the gait energy images of the registered gait video sequence and the corresponding features calculated in S22 are stored in the matching library. Thus in the non-first-time testing process, the step of extracting features from the registered gait video sequence can be omitted, and in S25, the features obtained in S24 can be directly compared to the features stored in the matching library so as to obtain the similarity therebetween, thus saving a lot of time.

In the present embodiment, a matching model based on the convolutional neural network is constructed, said model is trained by using a training gait video sequence including multiple views, and corresponding parameters are optimized, so that the trained matching model based on the convolutional neural network has the ability of cross-view gait recognition. In the testing process, features are extracted from the single-view test gait video and the registered gait video sequence to calculate the similarity therebetweeen by using the trained matching model based on the convolutional neural network, thereby identifying the identity of the person in the test gait video. Said method has higher precision in processing cross-view gait recognition, so it can be widely used in scenarios having video monitors, such as security monitoring in airports and supermarkets, person recognition, criminal detection, etc.

The flowcharts and block diagrams in the different depicted aspects illustrate the architecture, functionality, and operation of some possible implementations of apparatus, methods, system, and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The above aspects of the disclosure can be implemented by hardware, software or firmware or a combination thereof. For example the various methods, processes and functional modules described herein may be implemented by a processor (the term processor is to be interpreted broadly to include a CPU, processing unit, ASIC, logic unit, or programmable gate array, etc.). The processes, methods and functional modules may all be performed by a single processor or split between several processors; reference in this disclosure or the claims to a 'processor' should thus be interpreted to mean 'one or more processors'. The processes, methods and modules are implemented as machine readable instructions executable by one or more processors, hardware logic circuitry of the one or more processors or a combination thereof. Further, the teachings herein may be implemented in the form of a software product. The computer software product is stored in a storage medium and comprises a plurality of instructions for making a computer device (which can be a personal computer, a server or a network device such as a router, switch, access point, etc.) implement the method recited in the aspects of the disclosure of the present disclosure.

The above described is merely a specific embodiment of the present disclosure, but the protection scope of the present disclosure is not limited to this. Any variation or substitution conceivable by a person skilled in the art within the technical scope disclosed by the present disclosure should fall into the protection scope of the present disclosure. Thus the protection scope of the present disclosure is determined by the protection scope of the claims.

What is claimed is:

1. A gait recognition method based on deep learning, characterized in that said method comprises a training process and a recognizing process, which comprise:
    training process S1: extracting gait energy images from a training gait video sequence whose identity has been marked, and repeatedly selecting any two of them to train a matching model based on the a convolutional neural network until the model converges;
    recognizing process S2: extracting gait energy images from a single-view to-be-recognized gait video and a registered gait video sequence, respectively, and calculating similarity between the gait energy image of the single-view to-be-recognized gait video and each of the gait energy images of the registered gait video sequence by using the matching model based on the convolutional neural network as trained in S1, and predicting the identity based on the similarity and outputting the result of recognition,
    wherein said matching model based on the convolutional neural network comprises a feature extracting module and perceptron module,
    wherein the training process S1 comprises:
        step S11: extracting gait energy images from a training gait video sequence comprising multiple views;
        step S12: selecting a pair of gait energy images having the same identity as positive samples, and selecting a pair of gait energy images having different identities as negative samples;
        step S13: selecting a positive sample or a negative sample to be sent to the feature extracting module of the matching model based on the convolutional neural network, and extracting a pair of features corresponding to the pair of gait energy images included in said sample;
        step S14: sending the pair of features obtained in step S13 to the perceptron module of the matching model based on the convolutional neural network and outputting the result of matching;
        step S15: calculating an error between the result of matching and the real result, and optimizing said matching model based on the convolutional neural network; and
        step S16: repeating steps S13 to S15 until said matching model based on the convolutional neural network converges.

2. The method according to claim 1, characterized in that the training process S2 comprises:
    step S21: extracting a sequence of gait energy images of the registered gait video sequence;
    step S22: inputting the sequence of gait energy images of the registered gait video sequence into the feature extracting module of the matching model based on the convolutional neural network, and calculating the respective feature sequences;
    step S23: extracting the gait energy image of the single-view to-be-recognized gait video;
    step S24: inputting the gait energy image of the single-view to-be-recognized gait video into the feature extracting module of the trained matching model based on the convolutional neural network, and calculating the corresponding features;
    step S25: calculating similarity for the features obtained in S24 and the feature sequences obtained in S22 by the perceptron module of the matching model based on the convolutional neural network; and
    step S26: calculating a result of identity recognition by using a classifier based on the similarity obtained in S25.

3. The method according to claim 2, characterized in that step S21 further comprises a step of determining the first-time recognition process, and if it is the first-time recognition process, performing steps S22 to S26 in sequence after extracting the gait energy image of the registered gait video sequence; or else, if it is not the first-time recognition process, performing steps S23 to S26 in sequence;
    a matching library is provided in S22, and the gait energy images of the registered gait video sequence and the corresponding features calculated in S22 are stored in the matching library.

4. The method according to claim 3, characterized in that the views of the multiple-view training gait video sequence are divided equally into 11 views from 0° to 180° based on the viewing angles.

5. The method according to claim 4, characterized in that for each registered gait video in the registered gait video sequence, only the gait energy images under one view need to be extracted.

6. The method according to claim 5, characterized in that selection of the gait energy images in S12 should be a selection from gait energy images of different views based on the same probability.

7. The method according to claim 6, characterized in that a ratio between the numbers of positive samples and negative samples in S12 should be equal to a preset value.

8. The method according to claim 7, characterized in that said preset value is 1.

* * * * *